Aug. 4, 1942.      S. ROBINS      2,292,290
METHOD OF MAKING BELTS
Filed July 13, 1940
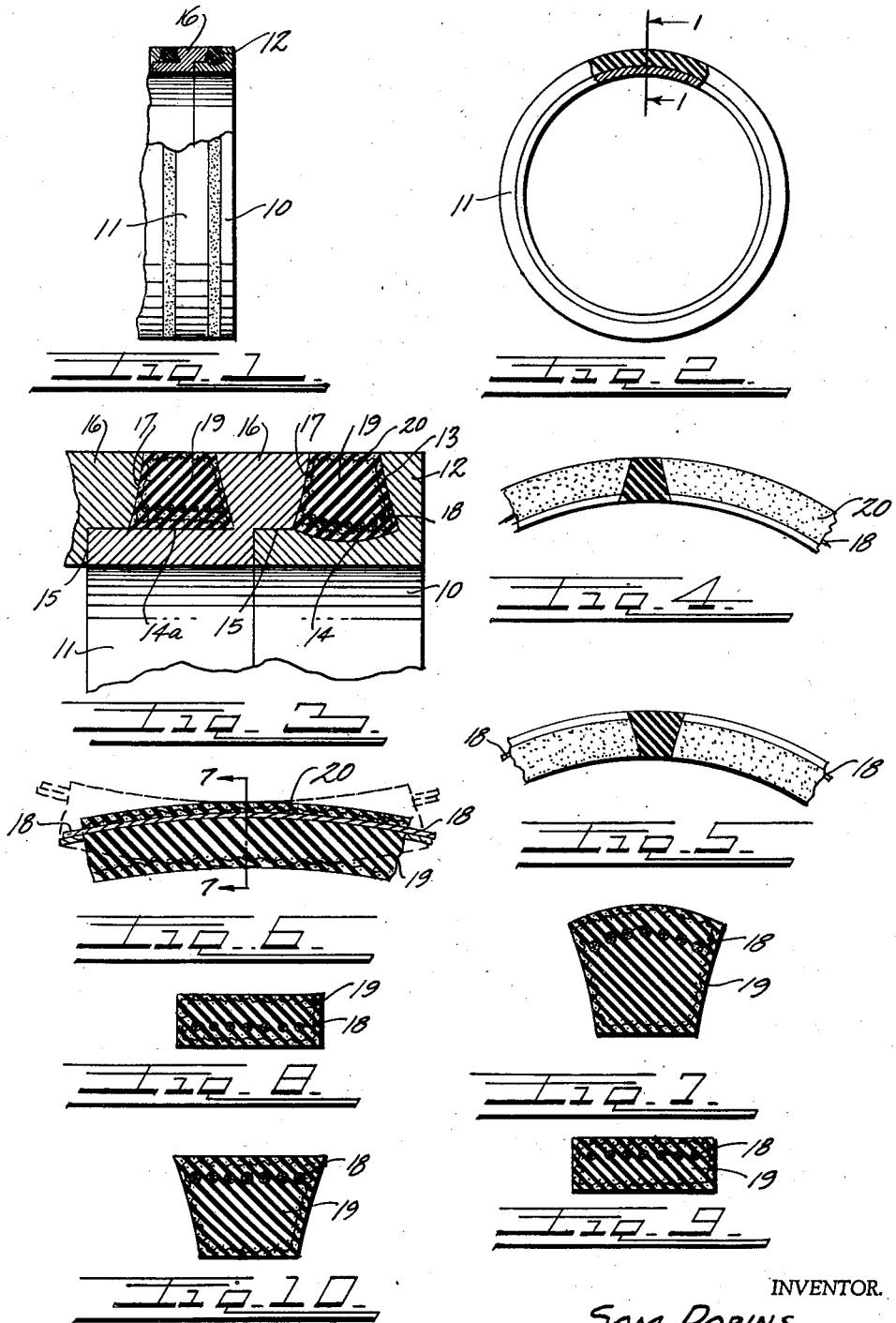
INVENTOR.
SAM ROBINS
BY Martin E. Anderson Patented Aug. 4, 1942

2,292,290

UNITED STATES PATENT OFFICE 2,292,290

METHOD OF MAKING BELTS

Sam Robins, Denver, Colo., assignor to The Gates Rubber Company, Denver, Colo., a corporation of Colorado Application July 13, 1940, Serial No. 345,285

5 Claims. (Cl. 18—53)

This invention relates to improvements in belts of the V-type and has reference more particularly to an improved method of making the same.

In United States Letters Patent No. 2,194,833, granted on March 26, 1940, a belt is shown and described in which there is an endless layer of cords which forms a tension resisting element of the belt and which is so constructed that the cord layer is transversely convex with its convex side towards the outer surface of the belt and in which the cords in the finished belt are so tensioned that the tension increases from the sides of the belt inwardly towards the middle.

This invention relates to a method by means of which a belt of the type referred to can be readily constructed in such a way as to obtain the proper tensioning of the cords without resorting to special tensioning means when applying the cord layer during the construction of the belt.

Another object of this invention is to produce a belt in which the layer of tensioning cords will remain uniformly spaced from the outer surface of the belt so that similarly positioned cords on each side of the middle of the belt will be similarly positioned and have equal tension.

The above and any other objects that may appear as this description proceeds are attained by means of a construction and an arrangement of parts that will now be described in detail, and for this purpose reference will be had to the accompanying drawing in which the invention has been illustrated, and in which:

Figure 1 is a view partly in side elevation and partly in section, showing the vulcanizing mold employed in the manufacture of this belt;

Figure 2 is a side elevation, partly in section, of the vulcanizing mould shown in Figure 1;

Figure 3 is a section similar to that shown in Figure 1, but to a somewhat enlarged scale;

Figure 4 is a fragmentary side elevation of the belt showing it in the position in which it is vulcanized, and showing also a section of the belt;

Fig. 5 is a side elevation similar to that shown in Figure 4, but shows the appearance of the belt after it has been reversed and in the position in which it is during operation, a section of the belt being also shown;

Figure 6 is a fragmentary longitudinal section of the belt;

Figure 7 is a cross section taken on line 7—7, Figure 6;

Figure 8 is a section through a flat belt showing the same in the position it occupies in the mould;

Figure 9 is a section similar to Figure 8, but shows the belt reversed; and

Figure 10 is a section similar to that shown in Figure 7 showing a flat top belt.

In the drawing reference numeral 10 designates one portion of a vulcanizing mould and reference numeral 11 represents the cooperating portion thereof. Moulds of this type can be made so as to contain as many units as are desired; but for the purpose of this explanation two units have been illustrated. It will be noted that the mould 10 has an outwardly extending flange 12 with a straight or slightly convex inwardly and upwardly inclined side wall 13. The bottom, which has been designated by reference numeral 14, is concave on its outer surface and terminates in a cylindrical surface 15. Bottom 14a is transversely flat and forms an extension of the cylindrical surface 15. The cooperating portion 11 of the mould is provided with an annular part 16 that has an upwardly and inwardly inclined side wall 17. When the three mould sections are assembled, they form two annular recesses, the cross section of one is shaped as shown at the right in Figure 3, and the cross section of the other is as shown to the left in Figure 3. The belt is built in the usual manner and formed into substantially the shapes shown in Figure 3 and indicated in Figures 4 and 5. During the construction one or more layers of cord 18 are embedded in the material of the belt adjacent the wider or outside surface thereof and the cords when positioned in or on the material during construction are all of the same tension. The body portion of the belt has been designated by reference numeral 19 and is formed from rubber or rubber composition and the whole belt is covered with bias cut rubberized fabric 20.

Belts of the general shape shown in the drawing are quite common and the novelty in the present invention relates to the method in which the belt is cured rather than to the structure thereof.

Belts of the general type and shape illustrated on the accompanying drawing are usually vulcanized in moulds of the type shown in U. S. Letters Patent No. 1,748,626, granted on February 25, 1930, to H. E. Waner. From this patent, it will be seen that the narrow edge of the belt is nearest the bottom of the mould during the vulcanization process, whereas, in the present application, the belt is reversed during the vulcanization process and occupies a position in the mould like that shown in Figure 3.

Attention is called to the fact that the layer of cord 18 is transversely concave with the convex surface nearest the bottom of the mould and therefore the cords nearer the middle of the belt are the shorter. After the belt has been vulcanized, the mould is separated in the usual way and the belt or belts removed. The removed belts are shaped as shown in Figure 4 with the narrow side towards the outside. After the belt has been completed, it is turned through 180° into the position shown in Figure 5, whereupon the narrow surface, which was on the outside during vulcanization, is now on the inside and the wider surface is towards the outside of the belt. Since the cords are substantially inextensible, they form a neutral axis which does not materially change in length when the belt is turned inside out, and therefore, after the belt has been changed from the shape shown in Figure 4 to that shown in Figure 5, the narrow surface will be of less length than the wider surface, whereas, before the belt was turned, the wide surface was shorter than the narrow surface. When the belt is removed from the vulcanizing mould, the material is in equilibrium and is practically free from compressive or tensile strains, whereas, after the belt has been reversed or changed from the position shown in Figure 4 to that shown in Figure 5, the material on the inside of the cord layer will be under compression and that portion of the material between the layer of cords and the outer surface will be under tension.

The cords 18 are substantially of the same tension when the belt is in the mould during vulcanization and the cords near the middle of the belt are shorter than those near the sides, because they form the peripheries of circles of smaller diameters. After the belt has been reversed and the narrow side of the belt brought to the inside, as shown in Figure 5, the cords near the middle of the belt will be under greater tension than the cords near the side walls, because of the outwardly convex shape of the layer, and by the simple expedient of vulcanizing the belt with the wide surface at the bottom of the mould and then turning the belt through a 180° after it has been vulcanized the tension in the cords will be altered so as to produce an arrangement in which the cords near the middle are under greater tension than the cords near the side walls and the variation in tension will vary uniformly from both sides to the middle of the belt.

The method described above has been found to be a satisfactory and simple way of producing a belt conforming to the claims of the patent above identified and in addition to this, there are other advantages accruing from this construction to which reference will now be made.

With the present method of forming a belt, the cords forming the layer of tension members do not have to be under any tension during the period of vulcanization and therefore have no tendency to move in response to tensional forces during the time when the rubber composition in which they are embedded is softened by the application of heat and as a result the cord layer will always remain uniformly spaced from the outer surface of the belt. Where the cords are under tension during the vulcanization step, it has been found that they will move in response to the tensional forces in the cords and in the finished belt will be somewhat differently positioned than expected and as a result of this, the uniform variation in tension that is desired will not be present after the belt has been vulcanized.

In Figure 6, a longitudinal section of the belt has been shown in which the dotted lines indicate the curvature of the section during the vulcanizing process and the full lines designate the shape of the section after the belt has been turned 180°. Since the cords are substantially inextensible, it is apparent that the material between the cords and the inner narrow side of the belt will be somewhat compressed and the cords 18 put under a corresponding tension due to the turning of the belt.

In Figure 3 the form on the left is shown with a transversely straight outer surface and a correspondingly shaped layer of cord. It is evident that when the belt shown to the left in Figure 3 is reversed, the variation in tension of the cords will not take place as above explained. The advantage gained by moulding a belt having a transversely straight outer surface and a correspondingly shaped layer of cord, with the wide side towards the bottom of the mould is that the cords do not have to be tensioned to any appreciable extent when they are placed in position and they will therefore not cut into the softened rubber composition during the vulcanization or curing process. When such a belt is reversed the cords will be put under tension due to the fact that they are positioned nearer the outer surface than the inner and this therefore affords a simple way of making a belt in which the cord is under tension in the finished belt.

In Figures 8 and 9 flat belts have been shown in which the cord layer is nearer the outside than the inside of the belt. By curing flat belts having a cord layer nearer the outside than the inside, with the outside at the bottom of the mould and then reversing them, the cords become tensioned and the material between the cords and the inner surface compressed both of which features are desirable and can be readily obtained by this method.

Having described the invention what is claimed as new is:

1. The method of making an endless rubber composition belt which comprises, curing the belt in an endless mould in which the belt is positioned with its outside surface to the inside, and reversing the cured belt whereby that portion of the belt between the neutral axis and the inside of the belt will be put under compression and that portion between the neutral axis and the outside will be put under tension.

2. The method of making a V-type endless belt of rubber composition which comprises, forming the belt with a layer of substantially parallel cords embedded therein adjacent its wider surface, curing it in an endless mould in which the belt is positioned with its wide surface to the inside and then reversing the belt whereby the material between the cords and the narrow side will be put under compression and the material between the cords and the wide side under tension.

3. The method of making V-type endless belts of rubber composition which comprises forming them with an endless cord layer positioned within the material and transversely curved with its convex surface towards the wide side of the belt, vulcanizing the belt in an endless mould with the wide side thereof to the inside, and reversing the belt after it has been vulcanized, whereby the tension of the cords nearest the middle of the layer will be greater than those farther from the center and whereby the material between the cord layer and the narrow side will be compressed.

4. The method of making a V-type endless belt of rubber composition which comprises, forming the belt of the desired material and shape with a layer of substantially inextensible cords embedded therein adjacent the outer side thereof, the layer being transversely convex with its concave side towards the inside of the belt, curing the belt in an endless mould in which it is positioned with its outer side towards the inside and then reversing the belt thereby bringing the outer side again to the outside whereby the tension in the cords will be progressively increased from the edges of the layer towards the middle thereof.

5. The method of making endless belts having a layer of cords embedded therein nearer the outer than the inner surface which comprises the steps of, curing in an endless mould in which the belt is positioned with its outer surface adjacent the bottom of the mould, and reversing the belt after it is removed from the mould whereby the cord tension will be increased and the material between the cords and the inside of the belt placed under compression.

SAM ROBINS.